UNITED STATES PATENT OFFICE.

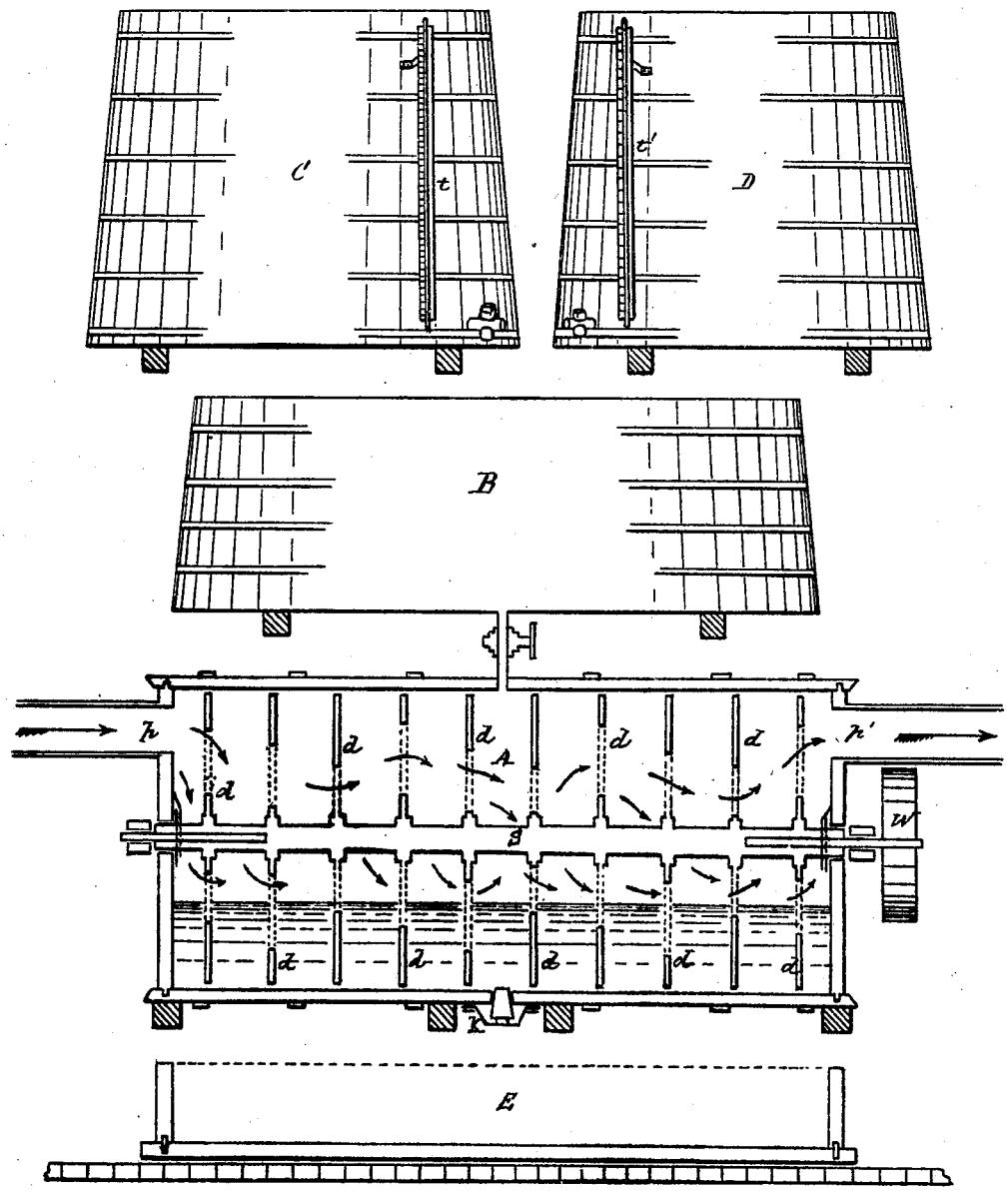

EBEN N. HORSFORD, OF CAMBRIDGE, MASSACHUSETTS.

IMPROVEMENT IN THE MANUFACTURE OF PHOSPHATE OF LIME AND YEAST-POWDERS.

Specification forming part of Letters Patent No. 130,298, dated August 6, 1872.

SPECIFICATION.

Acid Phosphate of Lime.

I, EBEN NORTON HORSFORD, of Cambridge, in the county of Middlesex and State of Massachusetts, have invented certain Improvements in the Manufacture of Pulverulent Acid Phosphate of Lime, of which the following is a specification:

It consists in mingling together a solution of monocalcic, orthophosphate, and free phosphoric acid, and a solution of the phosphate of lime of burned bones in hydrochloric acid, in such proportions that the total number of atoms of lime in the mixed solutions shall, substantially, equal the total number of atoms of phosphoric acid, and evaporating the mixture in a current of heated air to expel the volatile hydrochloric acid and water.

I treat burned bones with freshly-diluted sulphuric acid in the proportion of one thousand pounds of burned bones, (preferably burned gray,) with eight hundred pounds of sulphuric acid (oil of vitriol) of commerce, diluted with two thousand pounds of water. This mixture I subject to continuous mechanical agitation for about eighteen hours, when there results an emulsion, consisting chiefly of sulphate of lime with a small measure of sulphate of lead, skeleton bone-coal, and a diluted solution of lime, combined with phosphoric acid, in the proportion of about three of lime to five of phosphoric acid. This emulsion I draw off into a broad shallow pan, the bottom of which is of felt, and filter off the liquor. I wash the residuum with water to extract the lingering acid phosphate. The liquor thus leached and extracted is my super-acid phosphate liquor No. 1.

I prepare a saturated solution of bone-coal in hydrochloric acid as follows: I dilute commercial muriatic (hydrochloric) acid with twice its weight of water; to this diluted solution I add, in successive small quantities, fine bone-coal in the ratio of eighty pounds of bone-coal to three hundred and forty pounds of diluted hydrochloric acid. This mixture is stirred from time to time for twenty-four hours, and then leached through felt, and the residue washed with a weight of water equal to that of the original hydrochloric acid concentrated. This extract and solution thus produced is my hydrochloric-acid phosphate liquor No. 2.

The composition of liquor No. 1 is substantially $3CaO,5PO_5+aq$. The composition of liquor No. 2 is substantially $CaO,PO_5+2CaCl+aq$. These two liquors are to be mixed together. The liquor obtained from four hundred pounds of oil of vitriol with five hundred pounds of burned bones, with requisite water, No. 1, will be the quantity to be mixed with the liquor No. 2 obtained from eighty pounds of bone-black and three hundred and forty pounds of diluted hydrochloric acid, (one of acid to two of water,) and the required water to wash the residuum, as above described. On mingling these two liquors, which will be in about the ratio of eight of the former to one of the latter, or eight of No. 1 with one of No. 2, the resultant mixture will have a composition substantially of six atoms of monocalcic phosphate to two atoms of free hydrochloric acid—thus, $3CaO,5PO_5+CaO,PO_5+2CaCl = 6(CaO,PO_5)+2HCl$. I call this mixed liquor my acid phosphate liquor No. 3. It is a solution of monocalcic orthophosphate in the presence of a volatile acid—hydrochloric acid. This solution I evaporate to remove the surplus water and the volatile acid, and leave behind, mainly, monocalcic phosphate, with traces of chloride of calcium and acid phosphate of magnesia, in combination with the monocalcic phosphate.

As I have found that by subjecting the liquor No. 3 to elevated temperature it tends to lose effective acid-strength, I have sought to conduct the evaporation at low temperatures. It may be done with appropriate conveniences in vacuo. But I prefer to employ a current of heated air brought to play on great extent of surface, constantly renewed. The heater for supplying the heated air may be of various devices, but I prefer a collection of tubes heated by steam, through the interstices between which air is forced by means of a blower. This air I conduct into and through a chamber where the liquor is spread out over great extent of surface. For this object there are many well-known devices, but I prefer a horizontal cylindrical chamber, A, (see drawing,) in which a series of disks, $d\ d\ d$, fixed on an axle, $s$, is made to revolve by power, bringing up into the current of heated air with each revolution, from the liquor in the lower half, a great extent of thin fibers of the liquor to be concentrated. The object to be attained by the use of this evaporator is to produce crystallization by concentration, and the removal of the water and the volatile acid. To utilize the escaping hydrochloric-acid vapors I conduct them into a cylindrical chamber, similar to A, above described, provided with a similar axle and disks or arms, in which is an emulsion of fine bone-black and water. The hydrochloric-acid vapors condense and decompose and dissolve the phosphate of lime of the bone-black, and thus contribute to the preparation of new liquor, No. 2. When the emulsion of crystals in the cylindrical chamber A, which forms as the vapors of water and hydrochloric acid are removed, has become sufficiently dense to be suited to the subsequent treatment it is to receive, the contents are drawn off from the bottom of the chamber, through the tap K, into the kiln E.

In order to remove the hydrochloric acid fully, without permitting the temperature to rise too high, after the concentration has proceeded nearly to its proper limit I sometimes restore the water in part and again drive it out. The hydrochloric acid having been substantially removed there remains an emulsion, composed, mainly, of minute crystals of hydrous monocalcic phosphate and water. The water may be so far removed as to leave a non-hygroscopic monocalcic phosphate, easily reducible to a dry powder. In this form it is suited to various medicinal, culinary, and other purposes in the arts. But to better prepare it for use in making bread and the various forms of farinaceous food I subject it to a further process. I mix the emulsion in a convenient vessel with a proper proportion of starch or other equivalent farinaceous or other material, for the purpose of giving to the product a certain desirable friability, and also to protect it from the loss of available strength by preventing molecular aggregation, and, by spreading the acid body over great extent of surface, to enable it to act promptly when moistened. The quantity of starch or other equivalent material may be varied, to increase or diminish the strength of the mixture. The proportion which works best in self-raising flour I have found to be that in which the starch constitutes about thirty per cent. of the dried product.

This mixture may be dried in any convenient manner; but I prefer to dry it with constant stirring in a current of heated air, and for this purpose use an apparatus substantially like that described above for evaporation, except that in place of disks on the axle I employ arms projecting from the axle nearly to the inner circumference of the cylindrical chamber. The current of heated air is continued till the product is dry enough to be ground, by appropriate apparatus, to fine powder and bolted. In this form it is suitable for use as the acid in yeast-powders, self-raising bread preparation, and self-raising flour, or in such medicinal, culinary, or other purposes in the arts as a dry, substantially non-hygroscopic monocalcic phosphate may subserve.

The accompanying drawing will illustrate the construction of the evaporator and its connections.

A A is the evaporating-chamber, within which is the axle $s$ and the disks $d\ d\ d$. These disks are pierced with large holes $h\ h'\ h''$, as shown in F, Fig. 2, and so disposed on the shaft or axle $s$ as to bring the holes in each disk against the blanks on the disks on either side as nearly as may be. In place of the disks $d\ d\ d$ I sometimes employ blades or sections of disks disposed on the axle like the paddles of a carrier in a flouring-mill, constituting an interrupted screw, which serves to agitate the liquid to be evaporated and to force the body of heated air through the chamber. The essential principle is a current of heated air passing over great extent of constantly-renewed fresh surface of liquid to be evaporated. The heated air is received through the pipe $p$, and passes through the openings in the disks and around them to the erect pipe $p'$, which conveys the vapors of water and hydrochloric acid to the chamber containing an emulsion of bone-coal and water, where they are condensed and absorbed, as above described. The liquor No. 3 to be evaporated is supplied from the tank B through the wooden cock C. This mixed liquor of No. 1 and No. 2 is supplied, No. 1 from the tank C, and No. 2 from the tank D. The glass tubes $t\ t'$, communicating with the tanks near the bottom, are supported upon graduated scales marking the number of gallons, the height of the liquid in the tube corresponding with that of the fluid within the tank. This graduation facilitates the discharge in proportional quantities from C and D, determined by the respective specific gravities of the liquors No. 1 and No. 2. A certain determined quantity of liquor No. 1, tank C, corresponding with a definite weight of starch, with which it is ultimately to be incorporated, is drawn into B, observing the specific gravity and its relation to the specific gravity of liquor No. 2. A corresponding quantity of liquor is drawn from D into B. This mixed liquor No. 3 is then drawn into the chamber A through the cock $c$, and the disks set in motion through the band-wheel W; at the same time the current of heated air commences to flow through the chamber and the evaporation to proceed. When the required concentration has been attained, which is indicated by a peculiar creamy feel of the emulsion, in which there remains just water enough to permit perfect admixture with the starch, the charge is drawn off through the trap $k$ into the kiln E, where it is mixed with the proper proportion of starch. From this kiln the product passes to the drier above described, and, after thorough drying, thence to be ground and bolted, when it is fit for use.

I claim—

1. The solid monocalcic phosphate, prepared substantially as above described.

2. I claim the use of a current of heated air applied to the evaporation and drying of the liquid acid phosphate, substantially as above described.

3. I claim the mixture of the monocalcic phosphate as above prepared with starch or other equivalent material to preserve its available strength.

4. I claim the admixture of the above-described acid preparation with alkaline carbonates to constitute a yeast-powder.

5. I claim the admixture of the acid preparation above described with alkaline carbonates and flour in the production of self-raising flour.

E. N. HORSFORD.

Witnesses:
C. H. HUNNEWELL,
B. W. WHITNEY.